US012333292B2

(12) United States Patent
Klahre et al.

(10) Patent No.: US 12,333,292 B2
(45) Date of Patent: Jun. 17, 2025

(54) PRODUCT LIFECYCLE MANAGEMENT OF DATA MIGRATION DURING A SYSTEM UPDATE

(71) Applicant: SAP SE, Walldorf (DE)

(72) Inventors: Andre Klahre, Angelbachtal (DE); Michael Hettich, Heidelberg (DE); Nitish Kumar, Leimen (DE)

(73) Assignee: SAP SE, Walldorf (DE)

( * ) Notice: Subject to any disclaimer, the term of this patent is extended or adjusted under 35 U.S.C. 154(b) by 42 days.

(21) Appl. No.: 18/060,748

(22) Filed: Dec. 1, 2022

(65) Prior Publication Data

US 2024/0184559 A1 Jun. 6, 2024

(51) Int. Cl.
*G06F 8/65* (2018.01)
*G06F 16/25* (2019.01)

(52) U.S. Cl.
CPC .............. *G06F 8/65* (2013.01); *G06F 16/258* (2019.01)

(58) Field of Classification Search
CPC ................................. G06F 8/65; G06F 16/258
See application file for complete search history.

(56) References Cited

U.S. PATENT DOCUMENTS

| | | | | |
|---|---|---|---|---|
| 6,658,625 B1* | 12/2003 | Allen | ................ | G06F 16/258 715/236 |
| 6,738,801 B1* | 5/2004 | Kawaguchi | ............ | G06F 8/65 709/208 |
| 2003/0145315 A1* | 7/2003 | Aro | .................... | G06F 9/547 717/170 |
| 2003/0177486 A1* | 9/2003 | Bakke | .................. | G06F 8/656 717/169 |
| 2005/0257211 A1* | 11/2005 | Chatterjee | ............ | G06F 8/656 717/170 |
| 2006/0236083 A1* | 10/2006 | Fritsch | ................ | H04L 67/34 713/1 |
| 2019/0340282 A1* | 11/2019 | Zimmermann | ..... | G06F 16/2282 |

OTHER PUBLICATIONS

Neamtiu, Iulian, and Tudor Dumitraş. "Cloud software upgrades: Challenges and opportunities." 2011 International Workshop on the Maintenance and Evolution of Service-Oriented and Cloud-Based Systems. IEEE, 2011. (Year: 2011).*
Nabi, Mina, Ferhat Khendek, and Maria Toeroe. "An Approach for the Automation of IaaS Cloud Upgrade." arXiv preprint arXiv: 2103.12837 (2021). (Year: 2021).*
Hicks, Michael, and Scott Nettles. "Dynamic software updating." ACM Transactions on Programming Languages and Systems (TOPLAS) 27.6 (2005): 1049-1096. (Year: 2005).*

* cited by examiner

*Primary Examiner* — Bradley A Teets
*Assistant Examiner* — Joanne G Macasiano

(57) ABSTRACT

In some implementations, there is provided a computer-implemented method including initiating an upgrade of a service; performing the upgrade of the service by at least checking a system table including an indication of whether the upgrade of the service causes at least one data to be incompatible with the service after the upgrade is completed; in response to the indication indicating the upgrade of the service causes the at least one data to be incompatible, the method further comprises: continuing with the upgrade of the service, without converting the at least one data; detecting a first usage of the service; and in response to the detecting of the first usage, converting the at least one data that is incompatible with the service. Related systems, methods, and articles of manufacture are also disclosed.

17 Claims, 4 Drawing Sheets

PRODUCT LIFECYCLE MANAGEMENT OF DATA MIGRATION DURING A SYSTEM UPDATE

BACKGROUND

Database management systems have become an integral part of many computer systems. For example, some systems handle hundreds if not thousands of transactions per second (which in-turn can generate over time a large volume of corresponding data). On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance including use of resources, such as memory and storage.

SUMMARY

In some implementations, there is provided a computer-implemented method including initiating an upgrade of a service; performing the upgrade of the service by at least checking a system table including an indication of whether the upgrade of the service causes at least one data to be incompatible with the service after the upgrade is completed; in response to the indication indicating the upgrade of the service does not cause the at least one data to be incompatible with the service, continuing with the upgrade of the service; in response to the indication indicating the upgrade of the service causes the at least one data to be incompatible, the method further comprises: continuing with the upgrade of the service, without converting the at least one data; detecting a first usage of the service; in response to the detecting of the first usage, converting the at least one data that is incompatible with the service; blocking access to the service until after the converting of the at least one data is completed; and resuming access to the service including the at least one data converted to provide compatibility with the service.

In some variations, one or more of the features disclosed herein including the following features can optionally be included in any feasible combination. The service includes a database instance at a cloud platform. The upgrade is triggered by an indication of a request to upgrade the service, wherein the indication causes a container, which includes the upgrade, to be sent to the cloud platform. A product lifecycle system checks a central repository including the system table, wherein the system table includes identity information for the service being upgraded mapped to the indication of whether the upgrade of the service causes at least one data to be incompatible with the service after the upgrade is completed, and to conversion code to convert the at least one data to make the at least one data compatible with the service after the upgrade. The continuing with the upgrade of the service, without converting the at least one data comprises accessing and installing the upgrade in the container, without converting the at least one data, and setting a semaphore to indicate the service has the at least one data to be converted. The first usage of the service is detected by notifying at least the product lifecycle system of the first usage or setting a semaphore to indicate the first usage. The converting the at least one data that is incompatible with the service comprises obtaining from the product lifecycle system conversion code to convert the at least one data to make the at least one data compatible with the service after the upgrade.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

At an update (e.g., an upgrade, change, modification, and/or the like) of a service (e.g., an application, a solution, and/or the like) to bring the service to a new version, release, or apply a change (or replacement) for example, a product lifecycle management (PLM) system may control (and/or initiate) the update of the service with at least new code for the service. As a result of the update however, some of the data (e.g., end-user unique configuration or customization data such as business process logic and/or the like) used by the service may be incompatible with the updated service. In order use the updated service, the incompatible data may also require a conversion to provide compatibility with the service being updated. The incompatible data may be voluminous, so during conversion, the incompatible data may require an extensive amount of processing resources. Moreover, the data conversion may increase the amount of time associated with the down time of the service.

In some embodiments, there is provided a central repository, such as a database table (or "table," for short), associated with the PLM system. The central repository may define, for a given update, a set of data that causes an incompatibility during an update and code for performing the conversion of the incompatible set of data. For example, a table, such as a system table, may define set of data causing the incompatibility when the service is updated and code for converting the set of data.

In some embodiments, the central repository may have a plurality of data incompatibilities to convert as part of the upgrade. When this is the case, the PLM system may identify a first data incompatibility and convert (using the conversion code) the first data incompatibility. The PLM system may wait until this conversion is complete before checking and finding a second data incompatibility and convert (using the conversion code) the second data incompatibility. This process may be repeated until all of the data (which is identified in the central repository as being incompatible due to the update) has been converted.

Before providing additional details regarding the service updating provided by the PLM, the following provides an example of a system environment.

Figure 1:
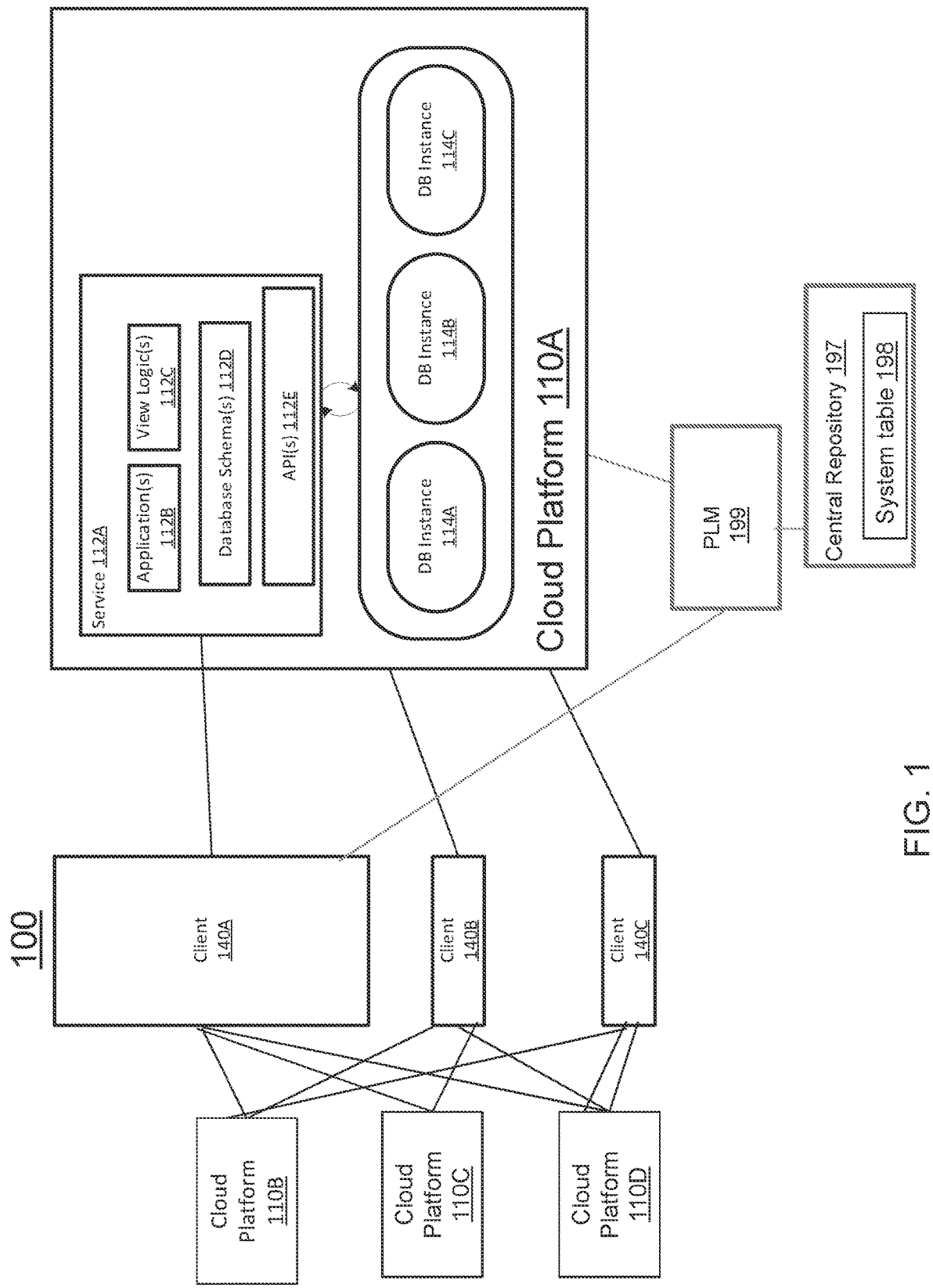
FIG. 1 depicts a diagram illustrating an example of a system including a product life cycle management (PLM) system, in accordance with some embodiments.

FIG. 1 depicts a diagram illustrating an example of a system 100 consistent with some implementations of the current subject matter. Referring to FIG. 1, the system 100 may include a plurality of cloud platforms 110A-D. Each of the cloud platforms may provide resources that can be shared among a plurality of tenants. For example, the cloud platforms 110A-D may be configured to provide a variety of services including, for example, software-as-a-service (SaaS), platform-as-a-service (PaaS), infrastructure as a service (IaaS), database as a service (DaaS), and/or the like, and these services can be accessed by one or more tenants (labeled clients) of the cloud platform.

The system 100 may also include a PLM system 199 (or "PLM," for short), which couples to the service 112A to perform an update of the service, in accordance with some embodiments. The PLM may also couple to a central repository 197 (labeled "Central Repository") including one or more tables, such as a system table 198. The table 198 may indicate the set of the data causing an incompatibility when the service is updated and may include code for converting the incompatible set of data. In some embodiments, the PLM is implemented as a service at one of the cloud platforms. In some embodiments, the central repository 197 may be implemented as a database management system instance which can be queried by the PLM. In some embodiments, the central repository may be implemented as a service at a cloud platform.

Figure 2A:
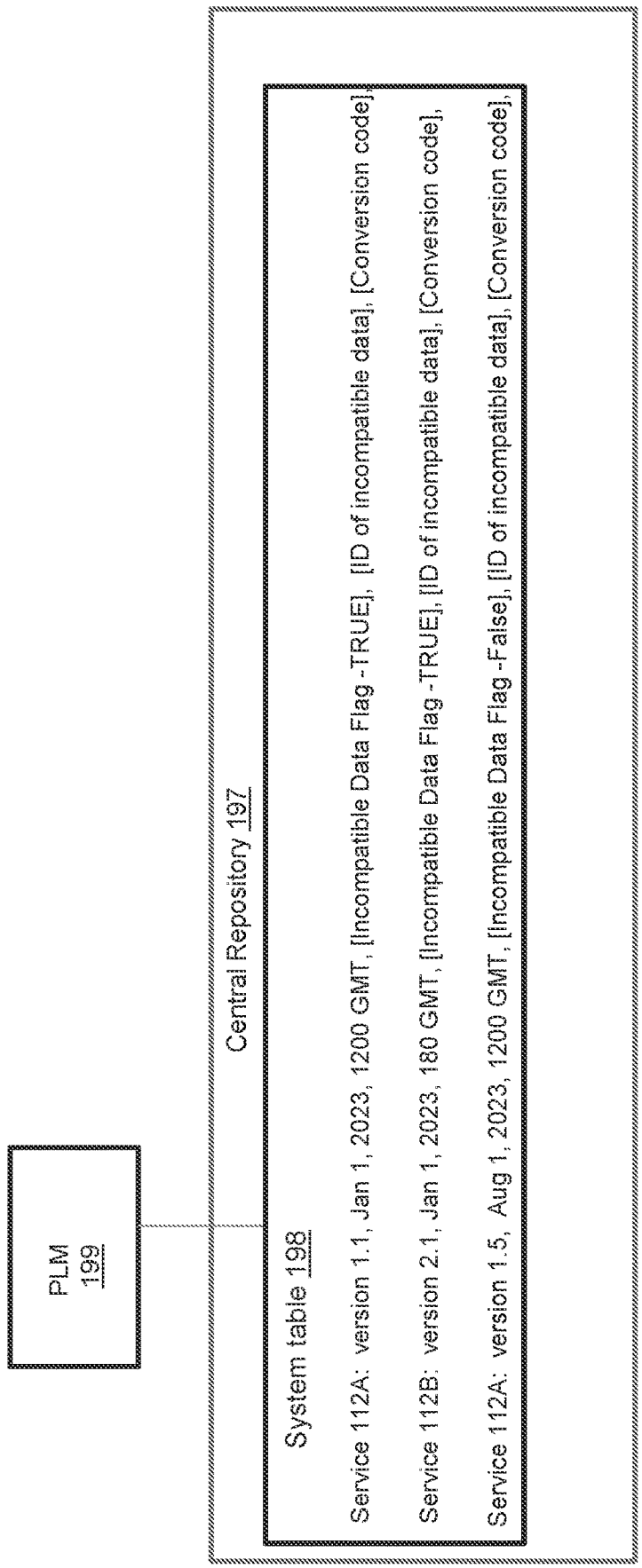
FIG. 2A depicts an example of a table including an indication of whether a release includes a data incompatibility and conversion code for the incompatibility, in accordance with some embodiments.

FIG. 2A depicts an example of the system table 198. In the example, for a given update of a service, there is provided a flag indicating if the update causes an incompatibility with data, so a data conversion is needed. Referring to line 1 of the system table 198, service 112A's release 1.1 (which is time stamped at Jan. 1, 2023 at 1200 GMT) includes an indication of incompatibility as shown by the incompatibility flag of "True" (so the update does cause an incompatibility with data so a data conversion is needed); identifies the incompatible data (e.g., a location or an identifier of the incompatible data, such as a table identifier); and/or the conversion code for the incompatibility data. Likewise, the system table includes similar information for service 112B version 2.1 and service 112A version 1.5. In the case of service 112C version 1.5, the incompatibility flag indicates there is no incompatible data (as indicated by the "False") requiring conversion as part of the update. If for example the update of service 112A version 1.1 includes a first data of the set of data having a first type of incompatibility and a second data having a second type of incompatibility, the table 198 may identify the first data within the set of data and a corresponding first conversion code, a second data within the set of data and a corresponding second conversion code, and so forth for any other data incompatibilities.

Referring again to FIG. 1, the system 100 includes a first tenant 140A, a second tenant 140B, and a third tenant 140C, although other quantities of tenants (which as noted are labeled as tenants) may be implemented as well on the cloud platform 110A. A user may access the client, and the clients may each comprise a user device (e.g., a computer including an application such as a browser or other type of application). And, the clients may each access, via the Internet and/or other type of network or communication link(s), at least one of the services at a cloud platform, such as cloud platform 110A-D. In some implementations, each of the clients/tenants 140A-C represents a separate tenant at the cloud platform 110A for example, such that a tenant's data is not shared with other tenants (absent permission from a tenant). Alternatively, each of the tenants 140A-C may represent a single tenant at the cloud platform 110A, such that the tenants do share a portion of the tenant's data, for example.

The cloud platform 110A may include resources, such as at least one computer (e.g., a server), data storage, and a network (including network equipment) that couples the computer(s) and storage. The cloud platform may also include other resources, such as operating systems, hypervisors, and/or other resources, to virtualize physical resources (e.g., via virtual machines), provide deployment (e.g., via containers) of applications (which provide services, for example, on the cloud platform, and other resources.

In the case of a cloud platform being a so-called "public" cloud platform, the services may be provided on-demand to a client, or tenant, via the Internet. For example, the resources at the public cloud platform may be operated and/or owned by a cloud service provider (e.g., Amazon Web Services, Azure, etc.), such that the physical resources at the cloud service provider can be shared by a plurality of tenants. Alternatively, or additionally, the cloud platform may be a "private" cloud platform, in which case the resources of the cloud platform may be hosted on an entity's own private servers (e.g., dedicated corporate servers operated and/or owned by the entity). Alternatively, or additionally, the cloud platform may be considered a "hybrid" cloud platform, which includes a combination of on-premises resources as well as resources hosted by a public or private cloud platform. For example, a hybrid cloud service may include web servers running in a public cloud while application servers and/or databases are hosted on premise (e.g., at an area controlled or operated by the entity, such as a corporate entity).

In the example of FIG. 1, the cloud platform 110A includes a service 112A, which is provided to for example the client 140A (or one of the other clients 140B). This service 112A may be deployed via a container, which provides a package or bundle of software, libraries, configuration data to enable the cloud platform to deploy during runtime the service 112A to, for example, one or more virtual machines that provide the service at the cloud platform. In the example of FIG. 1, the service 112A is deployed during runtime, and provides at least one application such as an application 112B (which is the runtime application providing the service at 112A and served to the client 140A). To illustrate further, client 140A may access the application 112B to view data and/or query data stored in a database instance 114A, for example.

The service 112A may also provide view logic 112C. The view logic (also referred to as a view layer) links the application 112B to the data in the database instance 114A, such that a view of certain data in the database instances is generated for the application 112B. For example, the view logic may include, or access, a database schema 112D for database instance 114A in order to access at least a portion of at least one table at the database instance 114A (e.g., generate a view of a specific set of rows and/or columns of a database table or tables). In other words, the view logic 112C may include instructions (e.g., rules, definitions, code, script, and/or the like) that can define how to handle the access to the database instance and retrieve the desired data from the database instance.

The service 112A may include the database schema 112D. The database schema 112D may be a data structure that defines how data is stored in the database instance 114A. For example, the database schema may define the database objects that are stored in the database instance 114A. The view logic 112C may provide an abstraction layer between the database layer (which include the database instances 114A-C, also referred to more simply as databases) and the application layer, such as application 112B, which in this example is a multitenant application at the cloud platform 110A.

The service 112A may also include an interface 112E to the database layer, such as the database instance 114A and the like. The interface 112E may be implemented as an Open Data Protocol (OData) interface (e.g., HTTP message may be used to create a query to a resource identified via a URI), although the interface 112E may be implemented with other types of protocols including those in accordance with REST (Representational state transfer). In the example of FIG. 1, the database 114A may be accessed as a service at a cloud platform, which may be the same or different platform from cloud platform 110A. In the case of REST compliant interfaces, the interface 112E may provide a uniform interface that decouples the client and server, is stateless (e.g., a request includes all information needed to process and respond to the request), cacheable at the client side or the server side, and the like.

The database instances 114A-C may each correspond to a runtime instance of a database management system (also referred to as a database). One or more of the database instances may be implemented as an in-memory database (in which most, if not all, the data, such as transactional data, is stored in main memory). In the example of FIG. 1, the database instances are deployed as a service, such as a DaaS, at the cloud platform 110A. Although the database instances are depicted at the same cloud platform 110A, one or more of the database instances may be hosted on another or separate platform (e.g., on-premise) and/or another cloud platform. Moreover, the service provided at the cloud platform may include other types of applications, such user interface applications, and the like.

The cloud platforms 110A-D may (as noted) be implemented using different technologies. As such, a system having heterogeneous cloud platforms may include for example, deployments at a SAP cloud, Microsoft Azure™, Amazon Web Services™, Google Cloud Platform™ data centers, a private data center, and/or the like. The heterogeneous cloud platform technology represents a multi-cloud system. In the case of database instances and/or their clients, some may be deployed at different private data centers (each of which may have different cloud platform technology, protocols, and the like), while some may be deployed at private data centers.

Moreover, the databases instances at the cloud platform may rely on the same or different storage or database technology. For example, a database management system instance may be an online transaction processing (OLTP) system using a relational database system. An example of an OLTP system is the SAP S/4HANA™ enterprise resource planning (ERP) system. Furthermore, the database management system instance may operate using for example the same or different storage technology, such as a row-oriented database system, a column-oriented database system, or a hybrid row-column store approach. Alternatively, or additionally, the database management system instance may be for example an online analytic processing (OLAP) system. Applications of OLAP systems include business reporting for sales, marketing, management reporting, business process management (BPM), budgeting, forecasting, financial reporting, and/or other types of analytics. An example of the OLAP system is the SAP BW/4HANA™ data warehouse solution, which can be used to for example answer multi-dimensional analytical (MDA) queries.

Figure 2B:
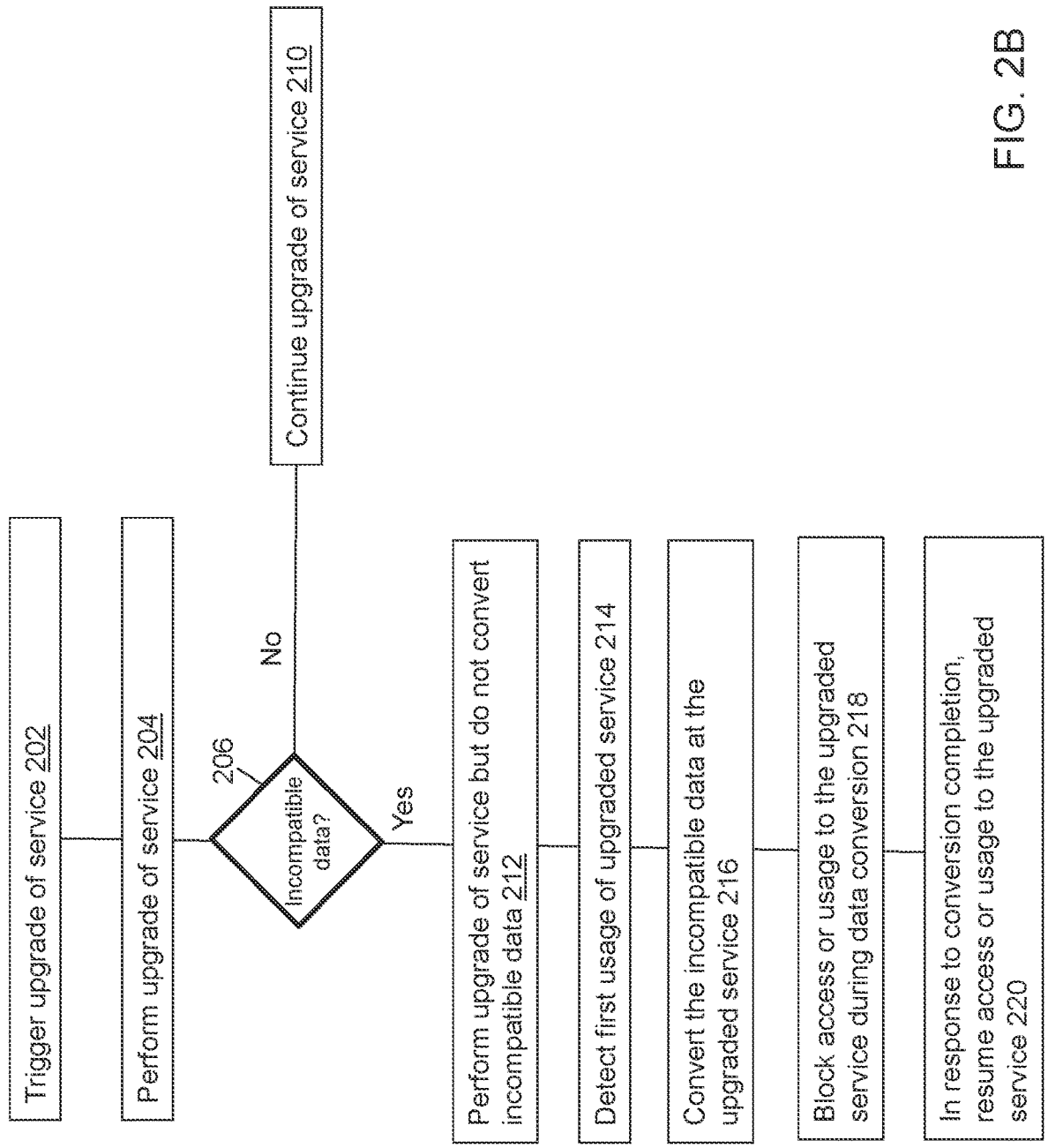
FIG. 2B depicts an example of a process for updating a service, in accordance with some embodiments.

FIG. 2B depicts an example of an update process, in accordance with some embodiments.

At 202, the update (also referred to herein as an upgrade) is triggered for a solution, such as a service 112A, for example. For example, the client 140A may access the PLM 199 and trigger the update of a service, such as service 112A. For example, a user interface view may be presented at the client 140A, and this user interface view may have a user interface element (e.g., an icon, a list of available updates, and/or the like), which when selected requests (e.g., triggers) the update of the service 112A. This update may be a new release, change, modification, replacement, and/or the like of the service 112A (or any of the components therein). For example, a container may include script for implementing the update as well as code for the update, data, and/or metadata. The container may then be sent to the host device (e.g., cloud platform 110A) executing the service 112A or may be sent to an orchestrator associated with the host device.

At 204, the upgrade is performed. For example, the PLM 199 may initiate the upgrade by sending the container to install the upgrade of service 112A at a host device (which in this example is cloud platform 110A).

As an initial part of the update at 204, the PLM 199 may check, at 206, to see if the update includes any incompatible data (which requires conversion). To perform the check, the PLM may access a table, such as system table 198 at the central repository 197. The table may include an identifier for the upgrade (e.g., service identifier identifying service 112A, a release number, a date, a time, and/or the like) and a flag (e.g., "True" indicating the upgrade causes a data incompatibility or "False" indicating the upgrade does not cause a data incompatibility). For example, the incompatibility may be in the form of customization data that defines a process for the service 112A. To illustrate further, the customization data may convert all currency to Euros, perform a value added tax calculation, and/or perform another function which has been customized by, or for, the tenant or client associated with service 112A. The table 198 may also identify the data, such as the customization table, that will need conversion due to the update. And, the table 198 may identify or include code (e.g., a program, script, and/or the like) for converting the incompatible data in those customization table, for example. As noted, a given update of a service may cause a plurality of data incompatibilities, in which case table 198 may identify for each data compatibility conversion code.

At 210 (no at 206), the PLM 199 may continue with the upgrade in response to the check at 206 indicating there is no incompatible data that needs conversion as part of the update. When this is the case for example, the update is installed at the host device of the service 112A.

At 212 (yes at 206), the PLM 199 may continue with the upgrade but not convert the incompatible data that needs conversion as part of the update. For example, the code for the service 112A may be updated and other aspects of the update may be performed but the incompatible data (which is identified by table 198) that needs conversion as part of the update is not converted. In other words, the update is completed by installing at the host device the code and the like but the conversion of the incompatible data is not performed.

At 214, a first usage of the update service is detected. For example, when the client 140A first attempts to use the updated service at 112A, this first usage is detected by the PLM 199. When client 140A accesses (e.g., selects, sends a command, and/or the like) service 112A after the update, this first access is detected. In some embodiments, when the first service 112A is accessed, it notifies the PLM 199 about the update. Alternatively, or additionally, a semaphore (or variable) is set during a first access of the service, and this semaphore may be accessed (e.g., read) by the PLM 199.

When the first usage is detected, the incompatible data is converted, at 216, by the PLM 199. In the case of service 112A for example, the PLM may access table 197 and access the code for converting the incompatible data at the service 112A. The code is then used to convert, for example, the one or more customization tables (which are identified at table 197) at the service 112A so that the customization tables are compatible with the service 112A.

At 218, the usage or access to the upgrade service is blocked until after the conversions at 216. For example, a semaphore may be used to indicate that the upgrade is taking place, so the semaphore may cause other services and the like to not access the service being upgraded.

In response to the conversion of the incompatible data being completed, the access or usage to the upgraded service is completed. For example, after the conversion of the one or more customization tables is completed, the upgrade is complete and the service 112A may be accessed by client 140A (as well as other clients). For example, when the service upgrade is completed, the semaphore may be cleared to indicate that the upgrade is complete so other services and the like can access the service.

Figure 3:
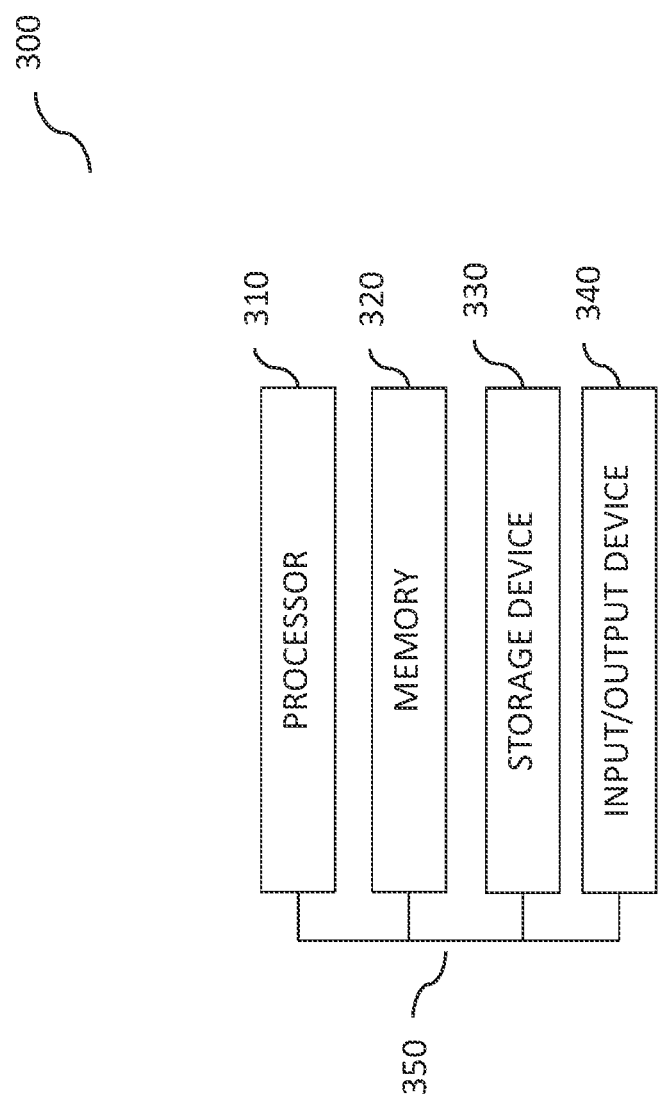
FIG. 3 depicts another example of a system, in accordance with some embodiments.

In some implementations, the current subject matter may be configured to be implemented in a system 300, as shown in FIG. 3. For example, the client refresh controller 190, system landscape, databases, and/or other aspects disclosed herein may be at least in part physically comprised on system 300. To illustrate further system 300 may further an operating system, a hypervisor, and/or other resources, to provide virtualize physical resources (e.g., via virtual machines). The system 300 may include a processor 310, a memory 320, a storage device 330, and an input/output device 340. Each of the components 310, 320, 330 and 340 may be interconnected using a system bus 350. The processor 310 may be configured to process instructions for execution within the system 300. In some implementations, the processor 310 may be a single-threaded processor. In alternate implementations, the processor 310 may be a multi-threaded processor.

The processor 310 may be further configured to process instructions stored in the memory 320 or on the storage device 330, including receiving or sending information through the input/output device 340. The memory 320 may store information within the system 300. In some implementations, the memory 320 may be a computer-readable medium. In alternate implementations, the memory 320 may be a volatile memory unit. In yet some implementations, the memory 320 may be a non-volatile memory unit. The storage device 330 may be capable of providing mass storage for the system 300. In some implementations, the storage device 330 may be a computer-readable medium. In alternate implementations, the storage device 330 may be a floppy disk device, a hard disk device, an optical disk device, a tape device, non-volatile solid state memory, or any other type of storage device. The input/output device 340 may be configured to provide input/output operations for the system 300. In some implementations, the input/output device 340 may include a keyboard and/or pointing device. In alternate implementations, the input/output device 340 may include a display unit for displaying graphical user interfaces.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method, comprising:
   initiating an upgrade of a service;
   performing the upgrade of the service by at least checking a system table including an indication of whether the upgrade of the service causes at least one data to be incompatible with the service after the upgrade is completed;
   in response to the indication indicating the upgrade of the service does not cause the at least one data to be incompatible with the service, continuing with the upgrade of the service;
   in response to the indication indicating the upgrade of the service causes the at least one data to be incompatible, the method further comprises:
   continuing with the upgrade of the service, without converting the at least one data;
   detecting a first usage of the service;
   in response to the detecting of the first usage, converting the at least one data that is incompatible with the service;
   blocking access to the service until after the converting of the at least one data is completed; and
   resuming access to the service including the at least one data converted to provide compatibility with the service.

Example 2: The computer-implemented method of Example 1, wherein the service includes a database instance at a cloud platform.

Example 3: The computer-implemented method of any of Examples 1-2, wherein the upgrade is triggered by an indication of a request to upgrade the service, wherein the indication causes a container, which includes the upgrade, to be sent to the cloud platform.

Example 4: The computer-implemented method of any of Examples 1-3, wherein a product lifecycle system checks a central repository including the system table, wherein the system table includes identity information for the service being upgraded mapped to the indication of whether the upgrade of the service causes at least one data to be incompatible with the service after the upgrade is completed, and to conversion code to convert the at least one data to make the at least one data compatible with the service after the upgrade.

Example 5: The computer-implemented method of any of Examples 1-4, wherein the continuing with the upgrade of the service, without converting the at least one data comprises accessing and installing the upgrade in the container, without converting the at least one data, and setting a semaphore to indicate the service has the at least one data to be converted.

Example 6: The computer-implemented method of any of Examples 1-5, wherein the first usage of the service is detected by notifying at least the product lifecycle system of the first usage or setting a semaphore to indicate the first usage.

Example 7: The computer-implemented method of any of Examples 1-6, wherein converting the at least one data that is incompatible with the service comprises obtaining from the product lifecycle system conversion code to convert the at least one data to make the at least one data compatible with the service after the upgrade.

Example 8: A system comprising:
at least one processor; and
at least one memory including program code which when executed by the at least one processor causes operations comprising:
initiating an upgrade of a service;
  performing the upgrade of the service by at least checking a system table including an indication of whether the upgrade of the service causes at least one data to be incompatible with the service after the upgrade is completed;
  in response to the indication indicating the upgrade of the service does not cause the at least one data to be incompatible with the service, continuing with the upgrade of the service;
  in response to the indication indicating the upgrade of the service causes the at least one data to be incompatible, the operations further comprise:
  continuing with the upgrade of the service, without converting the at least one data;
  detecting a first usage of the service;
  in response to the detecting of the first usage, converting the at least one data that is incompatible with the service;
  blocking access to the service until after the converting of the at least one data is completed; and
  resuming access to the service including the at least one data converted to provide compatibility with the service.

Example 9: The system of Example 8, wherein the service includes a database instance at a cloud platform.

Example 10: The system of any of Examples 8-9, wherein the upgrade is triggered by an indication of a request to upgrade the service, wherein the indication causes a container, which includes the upgrade, to be sent to the cloud platform.

Example 11: The system of any of Examples 8-10, wherein a product lifecycle system checks a central repository including the system table, wherein the system table includes identity information for the service being upgraded mapped to the indication of whether the upgrade of the service causes at least one data to be incompatible with the service after the upgrade is completed, and to conversion code to convert the at least one data to make the at least one data compatible with the service after the upgrade.

Example 12: The system of any of Examples 8-11, wherein the continuing with the upgrade of the service, without converting the at least one data comprises accessing and installing the upgrade in the container, without converting the at least one data, and setting a semaphore to indicate the service has the at least one data to be converted.

Example 13: The system of any of Examples 8-12, wherein the first usage of the service is detected by notifying at least the product lifecycle system of the first usage or setting a semaphore to indicate the first usage.

Example 14: The system of any of Examples 8-13, wherein converting the at least one data that is incompatible with the service comprises obtaining from the product lifecycle system conversion code to convert the at least one data to make the at least one data compatible with the service after the upgrade.

Example 15: A non-transitory computer-readable medium including program code which when executed by at least one processor causes operations comprising:
  initiating an upgrade of a service;
  performing the upgrade of the service by at least checking a system table including an indication of whether the upgrade of the service causes at least one data to be incompatible with the service after the upgrade is completed;
  in response to the indication indicating the upgrade of the service does not cause the at least one data to be incompatible with the service, continuing with the upgrade of the service;
  in response to the indication indicating the upgrade of the service causes the at least one data to be incompatible, the operations further comprise:
  continuing with the upgrade of the service, without converting the at least one data;
  detecting a first usage of the service;
  in response to the detecting of the first usage, converting the at least one data that is incompatible with the service;
  blocking access to the service until after the converting of the at least one data is completed; and
  resuming access to the service including the at least one data converted to provide compatibility with the service.

Example 16: The non-transitory computer-readable medium of Example 15, wherein the service includes a database instance at a cloud platform.

Example 17: The non-transitory computer-readable medium of any of Examples 15-16, wherein the upgrade is triggered by an indication of a request to upgrade the service, wherein the indication causes a container, which includes the upgrade, to be sent to the cloud platform.

Example 18: The non-transitory computer-readable medium of any of Examples 15-17, wherein a product lifecycle system checks a central repository including the system table, wherein the system table includes identity information for the service being upgraded mapped to the indication of whether the upgrade of the service causes at least one data to be incompatible with the service after the upgrade is completed, and to conversion code to convert the at least one data to make the at least one data compatible with the service after the upgrade.

Example 19: The non-transitory computer-readable medium of any of Examples 15-18, wherein the continuing with the upgrade of the service, without converting the at least one data comprises accessing and installing the upgrade in the container, without converting the at least one data, and setting a semaphore to indicate the service has the at least one data to be converted.

Example 20: The non-transitory computer-readable medium of any of Examples 15-19, wherein the first usage of the service is detected by notifying at least the product lifecycle system of the first usage or setting a semaphore to indicate the first usage.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
 initiating an upgrade of a service;
 performing the upgrade of the service by at least checking a system table including identity information for the service being upgraded mapped to an indication of whether the upgrade of the service causes at least one data to be incompatible with the service after the upgrade is completed and mapped to conversion code to convert the at least one data to make the at least one data compatible with the service after the upgrade is completed;
in response to the indication indicating the upgrade of the service does not cause the at least one data to be incompatible with the service, continuing with the upgrade of the service; and
in response to the indication indicating the upgrade of the service causes the at least one data to be incompatible, the method further comprises:
continuing with the upgrade of the service by accessing and installing the upgrade in a container, without converting the at least one data that is incompatible with the service and setting a semaphore to indicate the service has the at least one data that is incompatible with the service and that needs to be converted during a first usage of the service,
detecting the first usage of the service,
in response to the detecting of the first usage, converting the at least one data that is incompatible with the service,
blocking access to the service until after the converting of the at least one data is completed, and
resuming access to the service including the at least one data converted to provide compatibility with the service.

2. The computer-implemented method of claim 1, wherein the service includes a database instance at a cloud platform.

3. The computer-implemented method of claim 2, wherein the upgrade is triggered by an indication of a request to upgrade the service, wherein the indication causes a container, which includes the upgrade, to be sent to the cloud platform.

4. The computer-implemented method of claim 1, wherein a product lifecycle system checks a central repository including the system table.

5. The computer-implemented method of claim 4, wherein the first usage of the service is detected by notifying at least the product lifecycle system of the first usage or setting the semaphore to indicate the first usage.

6. The computer-implemented method of claim 4, wherein converting the at least one data that is incompatible with the service comprises obtaining from the conversion code to convert the at least one data to make the at least one data compatible with the service after the upgrade.

7. A system comprising:
at least one processor; and
at least one memory including program code which when executed by the at least one processor causes operations comprising:
initiating an upgrade of a service;
performing the upgrade of the service by at least checking a system table including identity information for the service being upgraded mapped to an indication of whether the upgrade of the service causes at least one data to be incompatible with the service after the upgrade is completed and mapped to conversion code to convert the at least one data to make the at least one data compatible with the service after the upgrade is completed;
in response to the indication indicating the upgrade of the service does not cause the at least one data to be incompatible with the service, continuing with the upgrade of the service; and
in response to the indication indicating the upgrade of the service causes the at least one data to be incompatible, the operations further comprise:
continuing with the upgrade of the service by accessing and installing the upgrade in a container, without converting the at least one data that is incompatible with the service and setting a semaphore to indicate the service has the at least one data that is incompatible with the service and that needs to be converted during a first usage of the service,
detecting the first usage of the service,
in response to the detecting of the first usage, converting the at least one data that is incompatible with the service,
blocking access to the service until after the converting of the at least one data is completed, and
resuming access to the service including the at least one data converted to provide compatibility with the service.

8. The system of claim 7, wherein the service includes a database instance at a cloud platform.

9. The system of claim 8, wherein the upgrade is triggered by an indication of a request to upgrade the service, wherein the indication causes a container, which includes the upgrade, to be sent to the cloud platform.

10. The system of claim 7, wherein a product lifecycle system checks a central repository including the system table.

11. The system of claim 10, wherein the first usage of the service is detected by notifying at least the product lifecycle system of the first usage or setting the semaphore to indicate the first usage.

12. The system of claim 10, wherein converting the at least one data that is incompatible with the service comprises obtaining from the conversion code to convert the at least one data to make the at least one data compatible with the service after the upgrade.

13. A non-transitory computer-readable medium including program code which when executed by at least one processor causes operations comprising:
initiating an upgrade of a service;
performing the upgrade of the service by at least checking a system table including identity information for the service being upgraded mapped to an indication of whether the upgrade of the service causes at least one data to be incompatible with the service after the upgrade is completed and mapped to conversion code to convert the at least one data to make the at least one data compatible with the service after the upgrade is completed;
in response to the indication indicating the upgrade of the service does not cause the at least one data to be incompatible with the service, continuing with the upgrade of the service; and
in response to the indication indicating the upgrade of the service causes the at least one data to be incompatible, the operations further comprise:
continuing with the upgrade of the service by accessing and installing the upgrade in a container, without converting the at least one data that is incompatible with the service and setting a semaphore to indicate the service has the at least one data that is incompatible with the service and that needs to be converted during a first usage of the service,
detecting the first usage of the service;

in response to the detecting of the first usage, converting the at least one data that is incompatible with the service, blocking access to the service until after the converting of the at least one data is completed, and resuming access to the service including the at least one data converted to provide compatibility with the service.

14. The non-transitory computer-readable medium of claim 13, wherein the service includes a database instance at a cloud platform.

15. The non-transitory computer-readable medium of claim 14, wherein the upgrade is triggered by an indication of a request to upgrade the service, wherein the indication causes a container, which includes the upgrade, to be sent to the cloud platform.

16. The non-transitory computer-readable medium of claim 13, wherein a product lifecycle system checks a central repository including the system table.

17. The non-transitory computer-readable medium of claim 16, wherein the first usage of the service is detected by notifying at least the product lifecycle system of the first usage or setting the semaphore to indicate the first usage.

* * * * *